United States Patent
Baker, Jr. et al.

(10) Patent No.: US 7,790,641 B2
(45) Date of Patent: Sep. 7, 2010

(54) BICOMPONENT SHEET MATERIAL HAVING LIQUID BARRIER PROPERTIES

(75) Inventors: John Frank Baker, Jr., Nashville, TN (US); Gregory W. Farell, Hendersonville, TN (US); Shannon Schoppman, Nashville, TN (US)

(73) Assignee: Fiberweb, Inc., Old Hickory, TN (US)

( * ) Notice: Subject to any disclaimer, the term of this patent is extended or adjusted under 35 U.S.C. 154(b) by 43 days.

(21) Appl. No.: 11/460,453

(22) Filed: Jul. 27, 2006

(65) Prior Publication Data

US 2007/0054579 A1  Mar. 8, 2007

Related U.S. Application Data (60) Provisional application No. 60/704,064, filed on Jul. 29, 2005.

(51) Int. Cl.
*D04H 1/00* (2006.01)
*D04H 13/00* (2006.01)
*D04H 3/00* (2006.01)

(52) U.S. Cl. ............... 442/361; 442/123; 442/340; 442/364; 442/381; 442/382; 442/400; 442/409; 428/364

(58) Field of Classification Search ........... 442/361, 442/364, 381, 382, 409, 123, 400, 340; 428/364
See application file for complete search history.

(56) References Cited

U.S. PATENT DOCUMENTS

| | | | |
|---|---|---|---|
| 4,619,864 A * | 10/1986 | Hendrix et al. | 442/157 |
| 5,308,691 A * | 5/1994 | Lim et al. | 442/345 |
| 6,368,609 B1 | 4/2002 | Fontenot | |
| 6,417,122 B1 * | 7/2002 | Newkirk et al. | 442/364 |
| 6,419,839 B1 * | 7/2002 | Cox et al. | 210/764 |
| 6,831,025 B2 * | 12/2004 | Rudisill et al. | 442/401 |

(Continued)

FOREIGN PATENT DOCUMENTS

WO     WO 98/18616     5/1998

(Continued)

OTHER PUBLICATIONS

PCT Notification of Transmittal of the International Search Report and the Written Opinion of The International Searching Authority, or the Declaration, mailed Jan. 26, 2007 for PCT/US2006/029722 (Filed Jul. 27, 2006).

(Continued)

*Primary Examiner*—Norca L Torres-Velazquez
(74) *Attorney, Agent, or Firm*—Alston & Bird LLP (57) ABSTRACT

The invention provides a sheet material comprising bicomponent filaments having first and second polymer components that are arranged in substantially distinct zones within the filaments, with the first polymer component formed of a relatively lower melting polymer and the second component formed of a relatively higher melting polymer. The filaments of the nonwoven fabric layer are densely arranged and compacted against one another to form smooth, substantially nonporous opposite outer surfaces, and the nonwoven fabric layer are calendered such that the lower melting sheath polymer is fused to the contacting surface portions of adjacent filaments to impart strength and coherency to the nonwoven fabric layer. The sheet material has excellent breathability and liquid barrier properties and may be useful in house wrap, medical garments, and envelope applications.

24 Claims, 6 Drawing Sheets

U.S. PATENT DOCUMENTS

| | | | |
|---|---|---|---|
| 7,179,951 B2 * | 2/2007 | Krishnaswamy-Mirle et al. | 604/378 |
| 2004/0029469 A1 | 2/2004 | Anderson | |
| 2004/0116022 A1 | 6/2004 | Langley | |
| 2004/0214495 A1 | 10/2004 | Foss et al. | |
| 2005/0130545 A1 * | 6/2005 | Bansal et al. | 442/415 |

FOREIGN PATENT DOCUMENTS

| | | |
|---|---|---|
| WO | WO 03/052190 | 6/2003 |

OTHER PUBLICATIONS

Canadian Office Action for Application No. 2,616,853 dated Nov. 20, 2009.

* cited by examiner

BICOMPONENT SHEET MATERIAL HAVING LIQUID BARRIER PROPERTIES

CROSS-REFERENCE TO RELATED APPLICATION

This application is related to and claims priority from U.S. Provisional Patent Application No. 60/704,064 filed Jul. 29, 2005, the contents of which are incorporated herein by reference.

FIELD OF THE INVENTION

The invention relates generally to nonwoven fabrics and more particularly to a nonwoven sheet material having properties, including liquid barrier and breathability properties, which make it useful in various applications including garments, housewrap, envelopes, print media, filtration, tags and labels, and cable wrap, among other applications.

BACKGROUND OF THE INVENTION

Nonwoven fabrics are used in a wide variety of applications. For example, nonwovens of light basis weight and open structure are used in personal care items such as disposable diapers. Nonwovens of heavier weights may be designed with pore structures making them suitable for filtration, or with barrier properties for applications such as housewrap or protective garments for medical or industrial uses.

Various types of nonwovens fabrics have been produced and sold commercially for use as a liquid barrier fabric in building construction or in protective garments. One such commercially available product is manufactured and sold by DuPont under the trademark Tyvek®. This product is formed from flash spun high-density polyethylene fibers which are bonded together to form a nonwoven sheet material.

Other commercially available products have used a nonwoven substrate with a film coating. For example, in Dunaway et al. U.S. Pat. No. 4,898,761, a barrier fabric is disclosed in which a polymer film is laminated to a nonwoven fabric, and the resulting composite sheet material is then needle-punched to provide micropores through the film. The nonwoven fabric is a spunbonded web formed of polyolefin filaments, and the polymer film can be applied to the nonwoven web by hot cast extrusion. U.S. Patent Publication No. 2004/0029469 A1 describes a moisture vapor permeable, water impermeable composite sheet material which is suitable for use as a housewrap material. The composite sheet material includes a nonwoven substrate and an extrusion-coated filler-containing film layer that has been rendered microporous by stretching.

The currently available nonwoven liquid barrier materials have various limitations. Some of the commercially available liquid barrier materials, when used as housewrap, can be easily torn during construction by ladders or by the wind. Liquid barrier materials formed from laminates of a film with a nonwoven substrate require a two-step process which increases the expense. The need exists for an economical barrier material with superior strength as well as excellent water and air barrier properties.

SUMMARY OF THE INVENTION

The present invention provides a nonwoven sheet material comprising a nonwoven fabric layer including bicomponent filaments having first and second polymer components that are arranged in substantially distinct zones within the filaments, with the first polymer component formed of a relatively lower melting polymer and the second component formed of a relatively higher melting polymer. The filaments of the nonwoven fabric layer are densely arranged and compacted against one another to form smooth opposite outer surfaces. The nonwoven fabric layer is calendered such that the lower melting polymer is fused to the contacting surface portions of adjacent filaments to impart strength and coherency to the nonwoven fabric layer. As a result of the calendering, the polymer of the lower melting component has softened and flowed to form a film-like texture on at least one outer surface of the nonwoven fabric layer. More particularly, the lower melting polymer is fused to the contacting surface portions of adjacent filaments to impart strength and coherency to the nonwoven fabric layer, and wherein at said substantially smooth outer surface the lower melting polymer forms a microporous film-like surface that permits moisture vapor to be transmitted through the sheet material while serving as a barrier to the penetration of liquids.

In one embodiment, the film-like texture is present on one of the outer surfaces of the nonwoven fabric layer and the opposite outer surface of the nonwoven fabric has a filamentary texture exhibiting the appearance of flattened filaments.

In one embodiment, the bicomponent filaments have a sheath-core cross-sectional configuration with the higher melting first polymer being located in the core and the lower melting second polymer in the sheath. The lower-melting first polymer component preferably comprises polyethylene and the second polymer component is preferably selected from the group consisting of polypropylene, polyester, and nylon.

The sheet material has excellent breathability and liquid barrier properties. In one advantageous embodiment, the sheet material has a hydrohead of at least 15 cm, more desirably at least 25 cm and a moisture vapor transmission rate of at least 4 g/100 in.$^2$/24 hrs.

In one embodiment, the sheet material includes a first layer of the bicomponent filaments that are bonded to a second layer of bicomponent filaments having a pigment dispersed in the sheath component of the filaments. The pigment results in the nonwoven fabric having an opacity that is greater than 90 percent.

In another embodiment, an antimicrobial agent is incorporated into the first polymer component. The antimicrobial agent is blended with the first polymer component prior to extrusion of the fibers so that it is present throughout the first polymer component. The antimicrobial agent may be present in the first polymer component at a concentration of from about 0.01% to 5% by weight, based on the weight of the first polymer component.

In yet another embodiment, the bicomponent filaments may be combined with one or more layers of meltblown polyethylene fibers to form a composite web. The composite web may then be thermally calendered under high pressure to produce a sheet material having improved liquid barrier properties and breathability.

In still another embodiment, the bicomponent filaments may be combined with one or more layers of very fine diameter fibers or nanofibers to form a composite web. The composite web may then be thermally calendered under high pressure to produce a sheet material having increased opacity.

The sheet material of the present invention has excellent liquid barrier properties and breathability and is useful in a in a wide variety of applications including garments such as industrial protective wear, clean room garments, coveralls, or medical garments, as filtration media for filtration, as a protective barrier such as housewrap or roof underlayment, in the manufacture of envelopes, tags and labels or print media, as a cable wrap, and for industrial and consumer related products where a quick release surface is needed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
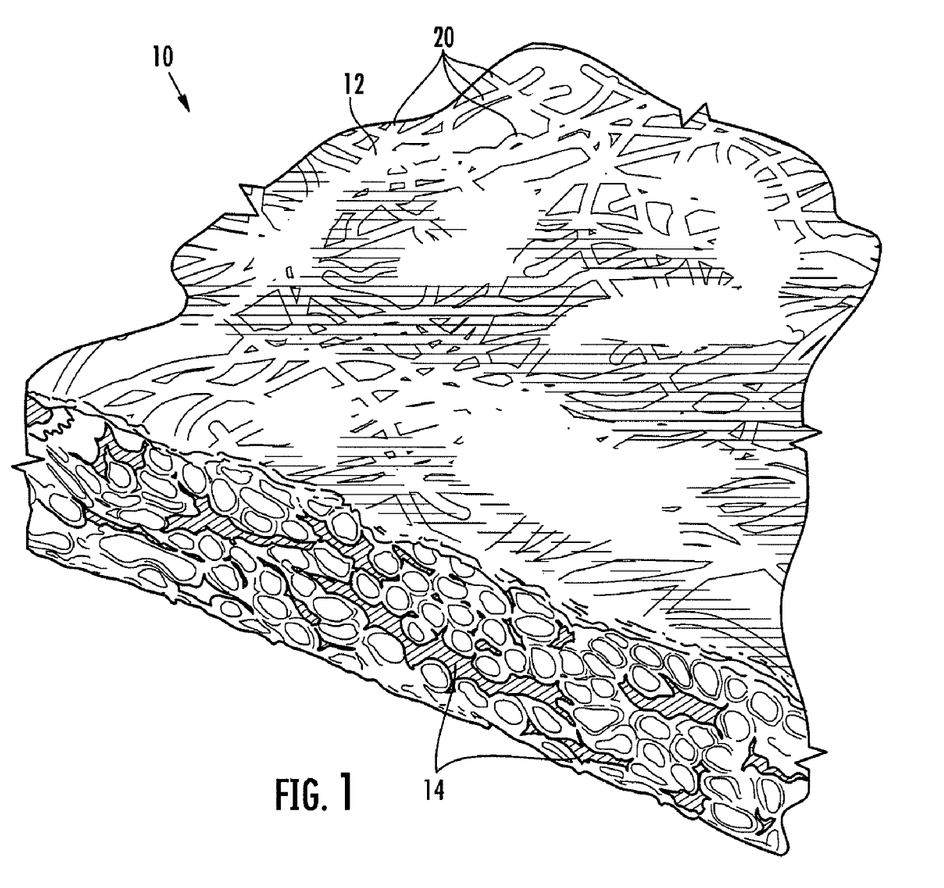
FIG. 1 is a perspective view of a nonwoven fabric comprising multicomponent fibers that are thermally bonded together to form a sheet material.

With reference to FIG. 1, a perspective view of a sheet material in accordance with one embodiment of the present invention is illustrated and broadly designated by reference number 10. The sheet material includes a spunbond nonwoven fabric layer comprised of a plurality of multicomponent continuous filaments 20 that are densely arranged and compacted against one another to form substantially smooth outer surfaces for the nonwoven fabric layer. The multicomponent fibers comprise at least two polymer components that are arranged in substantially distinct zones within the fibers and extend continuously along the length of the filaments.

The first polymer component has a melting temperature that is less than the melting temperature of the second polymer component so that the first polymer component may serve as a binder to thermally bond the individual filaments to one another. The melting temperature of a polymer may be determined with differential scanning calorimetry (DSC). The melting of a polymer generally occurs over a range of temperatures during which time, heat is absorbed by the polymer as the crystalline structure is broken and the polymer chains lose their ordered arrangement. DSC may be used to plot the amount of heat introduced into the system as the temperature increases. In the context of the present invention, the melting temperature of the polymer corresponds to the temperature at which the greatest amount of heat has been introduced into the polymer. In a DSC plot, this is generally the highest point on the graph of the melting transition. Suitable polymers for the lower melting first component include polyethylene, copolymers of propylene and ethylene, copolymers of ethylene with vinyl acetate (e.g. EVA) or with ethylene acrylates (e.g. EMA, EBA), ethylene acrylic ester terpolymers, ethylene vinyl acetate terpolymers, polylactic acid (PLA) polymers and copolymers, polypropylene, and polyester copolymers such as polyethylene terephthalate/polyethylene isophthalate copolymers. Preferred polyethylene resins include linear low density polyethylene, low density polyethylene, and high density polyethylene. In one alternative embodiment, the first component comprises high density polyethylene having a density greater than about 0.94 g/cc, preferably between and including 0.95 and 0.96 g/cc.

Suitable polymers for the higher melting second component include polypropylene, polyesters such as polyethylene terephthalate (PET) or polybutylene terephthalate (PBT), and polyamides such as nylon-6 or nylon 6-6. In one particularly advantageous embodiment, the nonwoven web comprises a sheath of high density polyethylene that surrounds a core of polyethylene terephthalate or polypropylene. Multicomponent filaments comprising a polyethylene component and a polyethylene terephthalate or polypropylene component may have many desirable characteristics. For example, polyethylene terephthalate has many desirable characteristics including strength, toughness, stiffness, and heat and chemical resistance. Preferably, the polymers are selected to have a difference in melting points (as defined above) of at least 10° C., more desirably at least 30° C.

In the embodiment illustrated, the spunbond nonwoven fabric layer comprises bicomponent filaments having a sheath-core cross-sectional configuration wherein the sheath polymer has a lower melting temperature than the core polymer. However, other cross-sectional configurations can be advantageously employed including side-by-side, segmented pie and islands-in-the-sea configurations. As can be seen in FIG. 1, on at least one of the outer surfaces of the nonwoven fabric layer, the layer exhibits a film-like outer surface 12 formed by calendering the sheet material 10. In the calendering operation, the sheet material passes through the nip of a pair of cooperating calender rolls under heat and pressure. The heat and pressure causes the lower-melting sheath polymer component to be melted or softened and to fuse to the sheath polymer component of adjacent filaments to produce a strong and coherent nonwoven fabric. However, the fusion of the sheath polymer component does not form a continuous monolithic structure. Throughout the thickness of the nonwoven fabric layer there are small randomly spaced pore-like openings 14 that permit moisture vapor to be transmitted through the fabric while substantially preventing liquids from passing into and through the fabric. At the outer surface 12 of the nonwoven fabric layer, the film-like surface is microporous and permits moisture vapor to be transmitted through the sheet material while serving as a barrier to the penetration of liquids. The dense and compact structure of the nonwoven fabric layer results in the sheet material having liquid barrier properties without sacrificing air and moisture vapor permeability. As a result, the sheet material may be used in a wide variety of applications where it may be desirable to have both liquid barrier properties and breathability. Such applications are discussed in greater detail below.

Figure 2A:
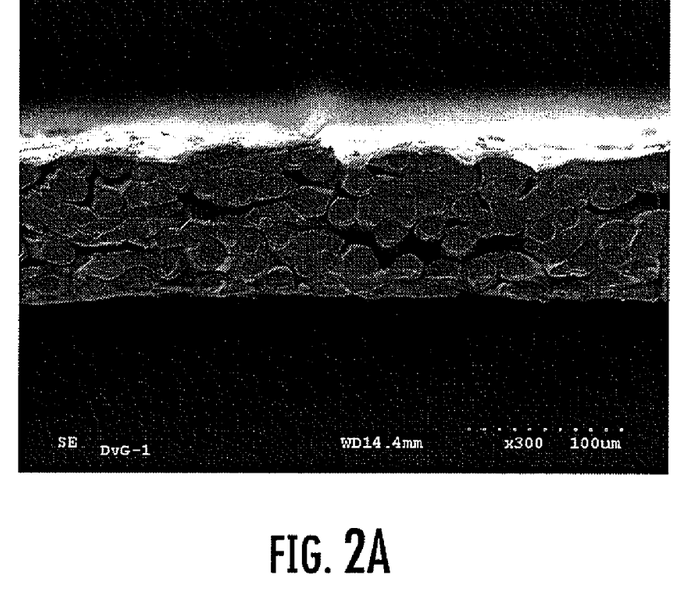
FIGS. 2A and 2B are scanning electron microscope photographs of a cross-sectional view of the nonwoven fabric.
Figure 2B:
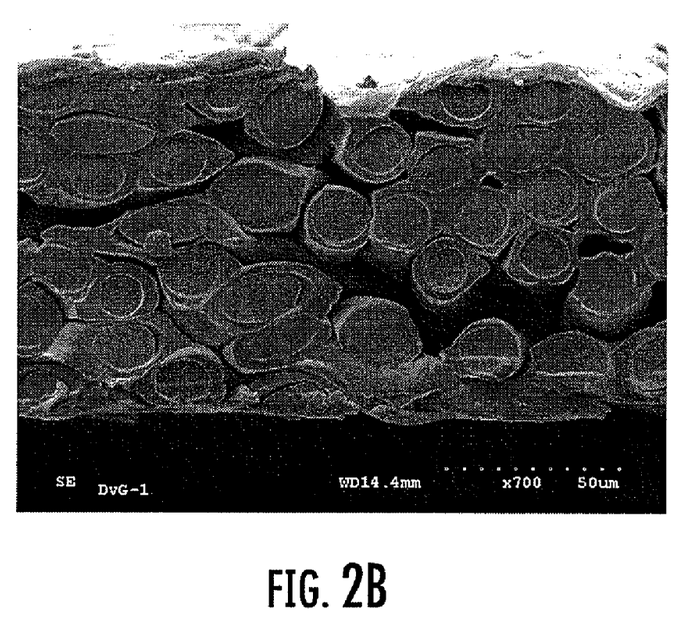

As can be seen from the scanning electron microscope photograph of FIGS. 2A and 2B, the bicomponent filaments are tightly packed together and form a dense sheet. The outer surface of the sheet material has a flat film-like surface. It can also be seen that a substantial portion of the spaces between the adjacent fibers is occupied by polymer material from the sheath-component that melted and flowed together when the sheet material was subjected to calendering. However, the sheath-core structure of the filaments is still evident. In addition, the nonwoven fabric still retains small intermittent openings between the filaments through which air and moisture vapor may travel. As a result, the sheet material provides liquid barrier properties while still retaining a desired degree of air and vapor permeability as well as flexibility.

Figure 3A:
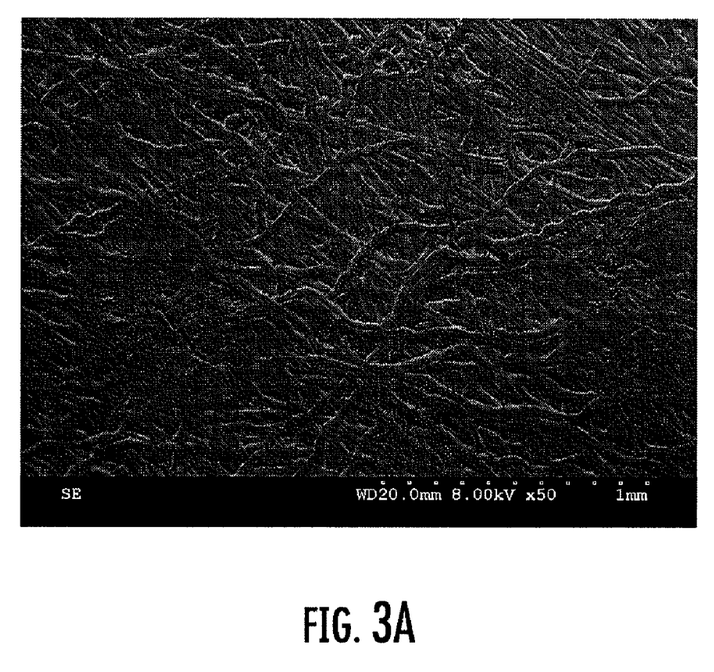
FIGS. 3A and 3B are scanning electron microscope photographs at two different magnifications of one outer surface of the a nonwoven sheet material produced in accordance with one embodiment of the invention.
Figure 3B:
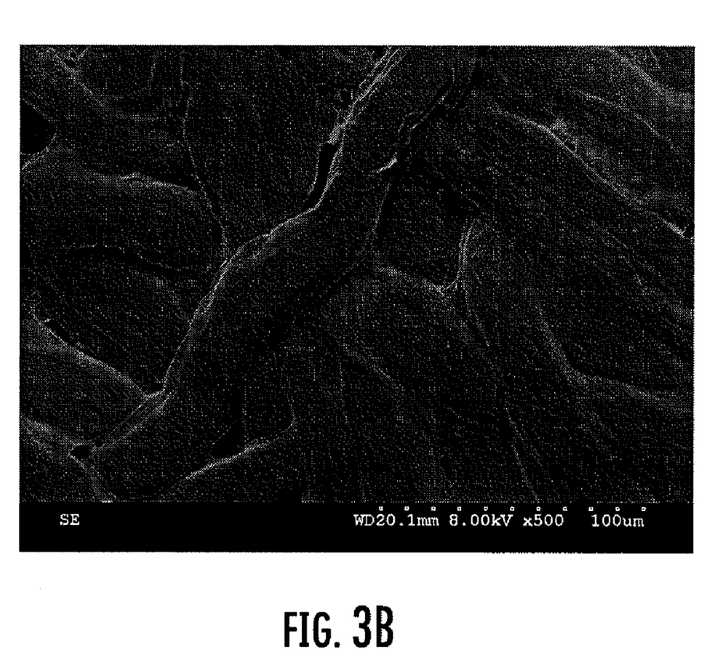
Figure 4A:
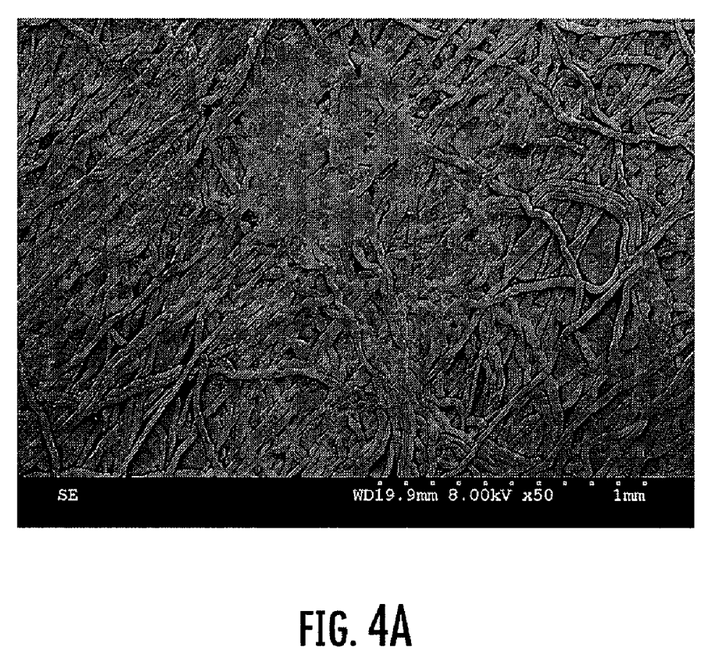
FIGS. 4A and 4B are scanning electron microscope photographs at two different magnifications of the opposite outer surface of the sheet material of FIGS. 3A and 3B.
Figure 4B:
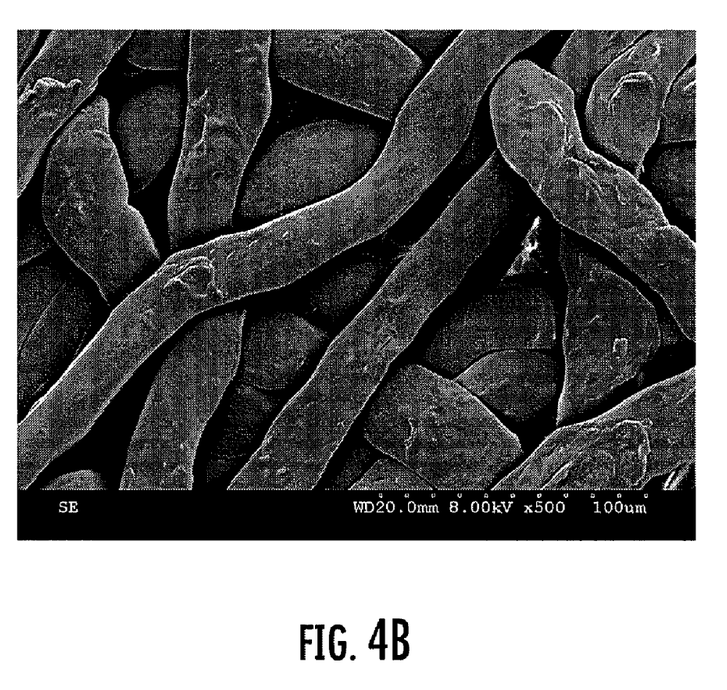

FIGS. 3 and 4 are scanning electron microscope photographs of the opposite outer surfaces of a sheet material according to an embodiment of the invention. The sample shown in these figures was subjected to a calendering operation in which one of the exposed surfaces contacted an internally heated smooth calender roll, and the opposite exposed surface contacted an unheated smooth anvil calender roll. As a result, the sheet material exhibits a different appearance on its opposite outer surfaces. In FIGS. 3A, 3B (at a magnification of 50× and 500× respectively) it can be seen that this outer surface of the fabric exhibits a relatively smooth film-like surface texture where a substantial portion of sheath component has melted and flowed together as a result of contacting the heated surface of the calender roll. As can be seen from the photographs, the filaments have been flattened and compacted together at the surface, and the sheath polymer has flowed to form a nearly continuous film-like surface. However, filamentary nature of the filaments can still be seen and the fabric still includes small random micro-openings at some of the filament crossover locations through which moisture vapor may pass through the fabric. In FIG. 3B several micro-openings can be seen, each have a maximum size of less than 10 µm. As discussed above, these small spaces or micro-openings permit the fabric to have excellent breathability while maintaining the desired liquid barrier properties of the fabric. However, on the opposite surface of the sheet material, shown in FIGS. 4A, 4B, where the sheet material contacted the unheated surface of the anvil roll, the surface of the sheet material has a discernibly different appearance and has a filamentary texture exhibiting the appearance of flattened filaments. In sharp contrast to what is seen in FIG. 3B, the filaments on the opposite surface, shown in FIG. 4B, retain their individuality. The sheath polymer has not flowed to form a film-like surface, and there are large spaces between the filaments that communicate with interior voids or passageways within the thickness of the fabric.

Figure 5:
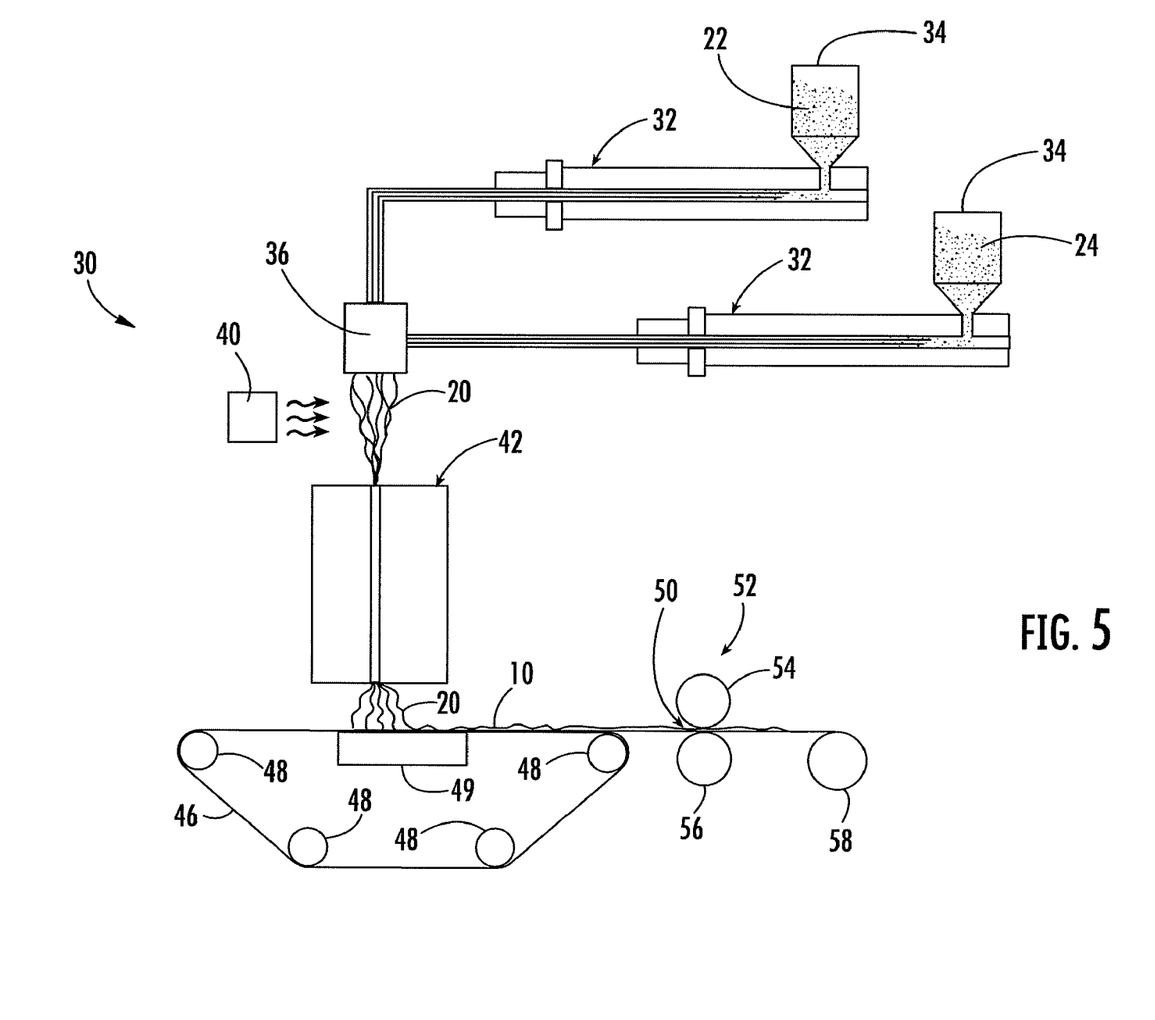
FIG. 5 is a schematic illustration of a process line that is used to prepare the nonwoven fabric of FIG. 1.
Figure 6A:
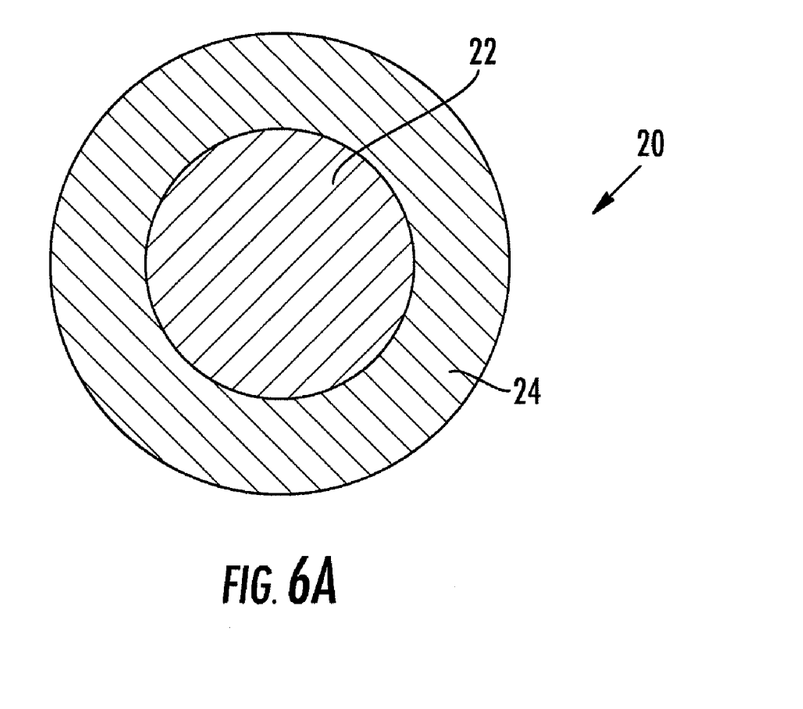
FIG. 6A is cross-sectional view of a sheath-core bicomponent fiber.
Figure 6B:
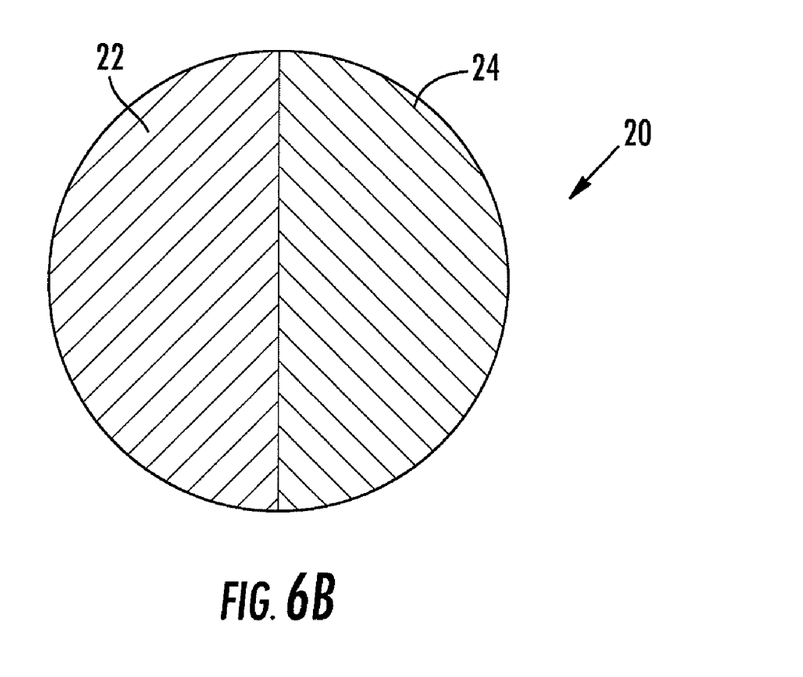
FIG. 6B is a cross-sectional view of a side-by-side bicomponent fiber.

The nonwoven fabric layer of sheet material 10 is produced by the well-known spunbond nonwoven process. Examples of processes for producing spunbond nonwoven fabrics are described in U.S. Pat. No. 3,338,992 to Kinney, U.S. Pat. No. 3,802,817 to Matsuki, U.S. Pat. No. 4,405,297 to Appel, U.S. Pat. No. 4,812,112 to Balk, and U.S. Pat. No. 5,665,300 to Brignola et al. FIG. 5 schematically illustrates an apparatus 30 for producing a thermally bonded spunbond nonwoven fabric. More particularly, in this embodiment the fabric is formed of randomly arranged bicomponent filaments 20 that are prepared by a pair of extruders 32 that supply two different polymeric materials 22, 24 from hoppers 34 to a bicomponent spinneret 36. Preferably, spinneret 36 is arranged to form sheath/core or side-by-side bicomponent filaments. Such configurations are shown in FIGS. 6A and 6B, respectively. The two polymer components combine in the spinneret to form bicomponent filaments having the two components located in two distinct zones within the cross-section and extending continuously along the length of the filaments. Spinnerets for producing bicomponent filaments are well known in the art and, therefore, are not described herein in detail. In one known embodiment, for example, the spinneret includes a housing about a spin pack which includes a plurality of vertically stacked plates having a pattern of openings arranged to create flow paths for directing the two polymers separately to the filament-forming openings in the spinneret. The filament forming openings are arranged in one or more rows, and the openings form a downwardly extending curtain of filaments 20 when the polymers are extruded through the spinneret 36. As the filaments 20 exit the spinneret 36, they are contacted by a quenching gas 40, which is typically air, from one or both sides of the filament curtain, which at least partially quenches the filament. In addition, a fiber draw unit or aspirator 42 is positioned below the spinneret 36 for drawing and attenuating the filaments 20.

The filaments 20 are deposited in a substantially random manner onto a moving carrier belt 46 that is driven over a set of rollers 48 by a conventional drive source (not shown) to form a loose web of randomly deposited filaments. In some embodiments, an appropriate suction means 49 may be present under the carrier belt 46 to assist depositing the filaments 20. It should be noted that while a single spinneret assembly and single layer filament web is shown, it is possible to provide additional spinning assemblies in-line to form a heavier web or a multi-layer nonwoven fabric.

In the arrangement shown in FIG. 5, the advancing nonwoven fabric 10 passes from the carrier belt 46 and is directed into and through a pressure nip 50 formed by calender rolls 52 comprising a heated roll 54 and a hard-surfaced anvil roll 56. Roll 54 may be internally heated in a conventional manner, such as by circulation of a heat transfer fluid through the interior of the roll. The anvil roll 56 may also be heated in a similar manner. The time, temperature and pressure conditions at the calender nip are sufficient to heat the filaments to cause the lower-melting first polymer component to melt and flow together so that the filaments are fused together in a densely arranged, compacted state and the lower melting polymer forms a film-like surface. In one embodiment, the pressure nip applies a pressure of about 1500 to 3000 pounds per lineal inch (2627 to 5254 N/cm), more specifically about 1800 to about 2500 pounds per lineal inch (about 3152 to about 4378 N/cm) and is heated to a temperature between about 240 and 265° F. (116 and 130° C.). The nonwoven fabric 10 is then directed from the calender rolls 52 to a suitable take-up roll 58.

In an alternative arrangement, the calendering step can be carried out off-line as a separate step. In this case, the web of filaments will be initially bonded in-line during the manufacturing process to form a coherent nonwoven fabric and then collected on a wind-up roll. The bonding can be by point bonding at discrete sites throughout the fabric, or throughout the entire fabric at locations where the filaments contact one another (area bonding). In the case of point bonding, the calender 52 shown in FIG. 5 would include a suitably engraved roll having a pattern of projections or lands and a cooperating anvil roll. One or more layers of the thus-formed nonwoven fabric may subsequently be subjected to an off-line calendering operation. The off-line calender apparatus can have various configurations. One suitable configuration includes two heated steel calender rolls and an unheated cotton fabric covered roll. The fabric is directed so as to s-wrap the lower bottom steel roll and to be compressed against the cotton covered roll both by the top and bottom steel rolls. When more than one nonwoven fabric layer is directed through the calender, the calendering operation bonds the layers together to form a unitary composite sheet material. Combining two or more layers advantageously enhances the spot-to-spot uniformity of the final sheet material in thickness and in strength.

If a smoother, more film-like surface is desired, additional polyethylene can be provided at one or both surfaces by combining an additional nonwoven layer of polyethylene fibers or filaments, such as a spunbond nonwoven layer formed from polyethylene monocomponent filaments or a meltblown layer formed of polyethylene fibers. If additional opacity is required, an additional opacity-enhancing layer can be incorporated into the sheet material 10. In one embodiment, for example, an opacity-enhancing nonwoven layer was produced by incorporating carbon black filler into the sheath of a PE/PP bicomponent spunbond nonwoven fabric. This opacity-enhancing layer can be combined with another PE/PP bicomponent spunbond nonwoven fabric pigmented with $TiO_2$ to form a composite nonwoven sheet material with a white appearance on one surface and a dark appearance on the opposite surface. Alternatively, the opacity-enhancing layer can be buried between two white nonwoven layers pigmented with $TiO_2$ so that the sheet material has the same white appearance on both surfaces. Another way to increase opacity is to laminate or extrude onto one surface of the spunbond nonwoven layer a polymer film containing an opacifying pigment, such as $TiO_2$ or carbon black.

Depending upon the calendering operation, the fabric can be produced with a two-sided appearance as shown in FIGS. 3 and 4, or both surfaces may by contacted by a heated calender roll to produce a film-like texture on both of the exposed surfaces of the sheet material.

The desired level of breathability and liquid barrier properties of the sheet material will of course depend upon its intended use and the conditions to which it may be exposed. For example, in house wrap applications it may be desirable for the sheet material to have both high liquid barrier properties and breathability, while in an envelope application, high liquid barrier properties may not be as crucial. The liquid barrier properties and breathability of the sheet material are affected by the thermal bonding conditions, thickness, filament diameter, calendering conditions and basis weight of the web. In one alternative embodiment, the sheet material may have a thickness of from 0.4 to 0.9 millimeters.

The sheet material of the present invention can provide high liquid barrier properties without sacrificing the desired level of breathability. In one alternative embodiment, the sheet material may have a hydrohead of at least about 15 cm. Preferably, the sheet material has a hydrohead of at least 25 cm, with a hydrohead exceeding 45 cm being preferred. For house wrap applications the sheet material preferably has a hydrohead of at least 25 cm and preferably a hydrohead that ranges between 100 and 900 cm. For envelope and other applications where having a high liquid barrier properties is not as critical, the sheet material typically has a hydrohead of at least 10 cm, with a hydrohead ranging between 25 and 300 cm being more preferred.

The breathability of the sheet material may be evaluated by determining its moisture vapor transmission rate (MVTR) and permeability. The desired MVTR will of course depend upon its end use. Preferably, the sheet material has a MVTR from 4 to 300 g/100 $inch^2$/24 hours. As discussed above, breathability in house wrap applications is important to the proper performance of the sheet material. In house wrap applications, the sheet material preferably has a MVTR between 4 and 300 g/100 $inch^2$/24 hours. For envelope and other applications where breathability is not as critical, the sheet material typically has a MVTR of at least 1 g/100 $inch^2$, with a MVTR ranging between 4 and 300 g/100 $inch^2$ being more preferred.

The permeability of the sheet material may be conveniently determined by measuring its air permeability using a commercially available air permeability instrument, such as the Textest air permeability instrument, in accordance with the air permeability test procedures outlined in ASTM test method D-1117. The desired permeability will of course depend upon its end use. Preferably, the sheet material has an air permeability, as measured by this procedure, of from 0 to 5 cfm/$ft^2$/min. As discussed above, breathability in house wrap applications is important for the proper performance of the wrap. In house wrap applications, the sheet material preferably has an air permeability between 0 and 5 cfm/$ft^2$/min.

FIGS. 6A and 6B illustrate a cross-sectional view of two exemplary multicomponent filaments of the invention. As illustrated in FIG. 6A, the filaments 20 may comprise bicomponent filaments having an inner core polymer domain 22 and a surrounding sheath polymer domain 24. In an alternative embodiment, the first and second polymer components 22, 24 may be arranged in a side-by-side arrangement as shown in FIG. 6B. As used herein, the term "multicomponent filaments" includes continuous filaments prepared from two or more polymers present in discrete structured domains in the filament, as opposed to blends where the domains tend to be dispersed, random or unstructured. For purposes of illustration only, the present invention is generally described in terms of a bicomponent filament comprising two components. However, it should be understood that the scope of the present invention is meant to include filaments with two or more structured components.

In general, the polymer domains or components are arranged in substantially constantly positioned distinct zones across the cross section of the multicomponent filament and extend continuously along the length of the multicomponent filament. One suitable configuration is a sheath/core arrangement, wherein a first component, the sheath, substantially surrounds a second component, the core. Other structured configurations as known in the art may be used, such as but not limited to, side-by-side, segmented pie, islands-in-the-sea, or tipped multi-lobal structures. The weight ratio of polymer domains or components can vary. Typically, the weight ratio of the first polymer component to the second polymer component ranges from about 20:80 to about 50:50, although the weight ratio can be outside of this range as well. In a preferred embodiment, the ratio of the first polymer component to the second polymer component is about 30:70.

Using polyethylene or polypropylene as the first polymer component permits many thermally sensitive melt additives to be incorporated throughout the thickness of the polyethylene during the extrusion process without degradation or loss of desired activity. For example, certain organic antimicrobial agents will be thermally degraded at the temperatures required for extruding PET. By incorporating the antimicrobial agent in a polyethylene or polypropylene sheath component surrounding a PET core component, an antimicrobial sheet material may be produced that includes many of the physical properties that are commonly associated with polyethylene terephthalate.

The antimicrobial agent can be suitably blended with the polymer of the lower-melting component at a concentration of from 0.01% to 5% by weight, based on the weight of the first polymer component. The specific concentration employed is dictated by the type of antimicrobial agent used and the target organisms, and can be readily determined without undue experimentation using routine screening tests.

In one alternative embodiment, the antimicrobial may comprise a broad spectrum antimicrobial agent that is effective against the majority of harmful bacteria encountered in water. In particular, various organic antimicrobial and antifungal agents, such as triclosan antimicrobial melt additive available from Microban®. For example, an antimicrobial agent such as 2,4,4'-trichloro-2'-hydroxydiphenol ether, or 5-chloro-2-phenol (2,4-dichlorophenoxy) compounds commonly sold under the trademark MICROBAN® B by Microban Products Company, Huntersville, N.C. may be used. However, it will be understood that various other antimicrobial agents that are safe, nontoxic and substantially insoluble in water can be used in the present invention.

The presence of the antimicrobial agent in the first polymer component 24 effectively inhibits the growth of microorganisms on the nonwoven fabric. Because the antimicrobial agent is dispersed throughout the nonwoven fabric, it provides antimicrobial activity to the surface of every fiber. In addition, by incorporating the antimicrobial agent into the first polymer component, such as the sheath, the first polymer component may serve as a reservoir for sustained diffusion and release of the antimicrobial agent.

The density and composition of the first polymer component may be selected to control the rate at which the antimicrobial agent migrates to the surface of the fibers of the nonwoven fabric. In general, many antimicrobial agents have some degree of mobility in polyolefin polymers. In one alternative embodiment, the density and/or composition of the first polymer component may be selected so that the antimicrobial agent diffuses through the polymer at a desired rate. In one embodiment, the diffusion rate of the antimicrobial agent may be controlled by the selection of the composition of the first polymer component. For example, the first polymer component may comprise a blend of one or more polymers, such as polyethylene, polypropylene, polybutylene, and copolymers thereof, wherein the composition of the blend, and proportions of each polymer in the blend, is selected so that the antimicrobial agent diffuses at a desired rate. In addition, the antimicrobial agent typically has little to no affinity for polyesters, such as polyethylene terephthalate. As a result, a nonwoven fabric may be prepared in which the antimicrobial agent diffuses to the surface of each fiber at a desired rate without significant migration of the antimicrobial agent into the core of the fiber. Nonwoven fabrics may thus be prepared wherein the first polymer component serves as a reservoir for controlled diffusion and release of the antimicrobial agent.

In one alternative embodiment, the sheet material may comprise two or more layers of bicomponent filaments that are laid down together to form the nonwoven web. In some embodiments, each layer may contain various additives in the polymer components that may be the same or different from each other. In a certain preferred embodiment, the sheet material may comprise a first layer of bicomponent filaments and a second layer of bicomponent filaments having one or more additives that have been incorporated into the first polymer component. This embodiment may be particularly useful for preparing envelopes having a desired level of opacity. In one embodiment, an envelope having a desired level of opacity may be prepared by combining a first layer of bicomponent filaments that have a relatively white appearance, and a second of layer of bicomponent filaments having a pigment, such as carbon, incorporated into the sheath component. The two nonwoven fabric layers are then calendered to form the sheet material of the invention. The first layer will typically comprise an exterior surface of the envelope. The presence of the pigment in the second layer imparts to the envelope the desired level of opacity. In envelope applications, the level of opacity typically ranges between 75 and 100 percent as measured with a Byk-Gardner Colorimeter. Preferably, the envelope has opacity greater than about 80 percent, and somewhat more preferably greater than about 90 percent reflectance.

In one alternate embodiment, the sheet material may comprise a combination of one or more bicomponent spunbond webs of the present invention with a web comprising meltblown fibers. In some embodiments, the meltblown fibers may comprise polyethylene. The meltblown webs can be prepared using methods known in the art, such as the method described in U.S. Pat. No. 3,849,241. The spunbond and meltblown layers can be processed separately and subsequently bonded to each other in an off-line process to form a multi-layer sheet material. In one advantageous embodiment, the meltblown fibers are deposited directly onto a multiple component spunbond layer of the present invention in an in-line process.

The spunbond and meltblown layers can be thermally bonded to one another, for example with a spunbond layer sandwiched between two meltblown layers. In other embodiments, the sheet material may comprise a single spunbond layer directly bonded to a single meltblown layer. As discussed above, bonding is preferably done in a manner which preserves both the breathability and barrier properties of the fabric. Alternate methods for bonding the layers of the composite sheet include through-air bonding, steam bonding, and adhesive bonding. For example, an adhesive may be applied in a discrete pattern between adjacent layers or as a continuous layer if the adhesive is a breathable adhesive.

The composite sheet material of the present invention preferably have a basis weight between about 10 to 150 $g/m^2$, more preferably between about 34 to 100 $g/m^2$, and most preferably between about 54 to 68 $g/m^2$, with a Frazier air permeability preferably in the range of about 3 to 21 $cm^3/min/cm^2$, more preferably in the range of 4 to 12 $cm^3/min/cm^2$, and most preferably in the range of 5 to 11 $cm^3/min/cm^2$, and a hydrostatic head preferably of at least 15 cm with a range of about 35 to 150 cm $H_2O$ being more preferable. In some embodiments the composite sheet material may have a hydrostatic head in the range of about 45 to 120 cm $H_2O$, or in the range of 55 to 100 cm $H_2O$.

In some embodiments, stabilizers and antioxidants may also be added to the polymer components. Other additives may also be added in accordance with the present invention. For example inorganic additives such as titanium dioxide, talc, fumed silica or carbon black. The polymer resin may also contain other additives, such as other polymers, diluents, compatibilizers, antiblocking agents, impact modifiers, plasticizers, UV stabilizers, pigments, delusterants, lubricants, wetting agents, antistatic agents, nucleating agents, rheology modifiers, water and alcohol repellents, and the like. It is also anticipated that additive materials which have an affect on processing or product properties, such as extrusion, quenching, drawing, laydown, static and/or electrical properties, bonding, wetting properties or repellency properties may also be used in combination with the polymer components. In particular, polymeric additives may also be used that impart specific benefits to either processing and/or end use.

The following examples are included to exemplify the invention and should not be considered as limiting the scope of the invention.

Test Methods

In the description above and in the non-limiting examples that follow, the following test methods were employed to determine various reported characteristics and properties. ASTM refers to the American Society for Testing and Materials, MTCC refers to the American Association of Textile Chemists and Colorists, INDA refers to the Association of the Nonwovens Fabrics Industry, and TAPPI refers to the Technical Association of Pulp and Paper Industry.

Basis Weight is a measure of the mass per unit area of a fabric or sheet and was determined by ASTM D-3776-96, which is hereby incorporated by reference, and is reported in units of g/m².

Grab Tensile Strength is a measure of breaking strength of a fabric when subjected to unidirectional stress. This test is known carried out in accordance with ASTM D 4632—Standard Test Method for Grab Breaking Load and Elongation of Geotextiles, 1991 (reapproved 1996) and is reported in pounds. Grab tensile strength is reported in the examples for the machine direction (MD) and for the cross-direction (XD).

Percent Elongation is measured at the point where the sample initially fails and is the elongation at which the load peaks during the grab tensile measurement. Percent elongation is reported in the examples for the machine direction (MD) and for the cross-direction (XD).

Hydrostatic Head (hydrohead) is a measure of the resistance of a sheet to penetration by liquid water under a static pressure. The test is conducted according to MTCC-127, which is hereby incorporated by reference, and is reported in centimeters.

Moisture Vapor Transmission Rate (MVTR) is determined by ASTM E 96, Standard Test Methods for Water Vapor Transmission of Materials; 1995, Procedure A at 50% relative humidity (RH) and 23° C. (73° F.) and is reported in grams per 100 square inches per 24 hours.

Mullen burst strength is determined by ASTM D3786, Standard Test Method for Hydraulic Bursting Strength of Textile Fabrics—Diaphragm Bursting Strength Tester Method.

Air Permeability, unless otherwise stated was measured with a Textest air permeability instrument, in accordance with ASTM test method D-1117, which is hereby incorporated by reference, and is reported in cfm/ft²/min.

Frazier Air Permeability is a measure of air flow passing through a sheet under at a stated pressure differential between the surfaces of the sheet and was conducted according to ASTM D 737, which is hereby incorporated by reference, and is reported in (m³/min)/m².

Thickness of the fabric or sheet was determined according to ASTM D 1777-96, - Standard Test Method for Thickness of Textile Materials which is hereby incorporated by reference, and is reported in mils (1 mil=0.001 of an inch).

Opacity is a measure of the amount of light obscured or prevented from passing through the sheet material and was measured with a Byk-Gardner Colorimeter and determined according to TAPPI method T425 and is expressed in %. Opacity (89% reflectance backing), sometimes called contrast ratio, $C_{0.89}$ is defined as 100 times the ratio of the diffuse reflectance, $R_0$, of a specimen backed by a black body of 0.5% reflectance or less to the diffuse reflectance, $R_{0.89}$, of the same specimen backed with a white body having an absolute reflectance of 0.89; thus $C_{0.89}=(R_0/R_{0.89})$.

EXAMPLE 1

Fifteen different spunbond nonwoven fabrics were prepared in accordance with the invention. The fabric samples comprised substantially continuous bicomponent filaments that were thermally bonded to one another. The bicomponent filaments had a sheath/core configuration wherein the weight ratio of the sheath component to the core component varied from between 50:50 to about 30:70. The bicomponent filaments were thermally bonded together with a calender nip under a pressure of 2500 pounds per inch and a temperature of 265° F., wherein:

PE is a polyethylene having a density of 0.89 to 0.96 g/cm³ and a melt index of 6 to 40.

PP is a polypropylene having a density of about 0.90 g/cm³.

PET is a poly(ethylene terephthalate) having an intrinsic viscosity of 0.5 to 0.9.

The physical properties of the resulting nonwoven fabrics are discussed in Tables 2 and 3 below.

TABLE 1

| Sample | Sheath Polymer | Core Polymer | Weight Ratio of sheath to core | TiO₂ (%) | Layers |
|---|---|---|---|---|---|
| Sample 1 | PE | PP | 50:50 | — | — |
| Sample 2 | PE | PP | 50:50 | — | — |
| Sample 3 | PE | PP | 30:70 | 0.3 | 4 layer |
| Sample 4 | PE | PP | 30:70 | 0.3 | 4 layer |
| Sample 5 | PE | PP | 30:70 | 1 | 4 layer |
| Sample 6 | PE | PP | 30:70 | 1 | 4 layer |
| Sample 7 | PE | PP | 70:30 | 0.3 | 4 layer |
| Sample 8 | PE | PP | 70:30 | 1 | 4 layer |
| Sample 9 | PE | PP | 70:30 | 1 | 1 layer |
| Sample 10 | PE | PP | 70:30 | 1 | 2 layer |
| Sample 11 | PE | PET | — | — | 2 PE/PET, 2 SBPE |
| Sample 12 | PE | PET | — | — | 2 PE/PET 2 SBPE |
| Sample 13 | PE | PET | 30:70 | — | — |
| Sample 14 | PE | PET | 30:70 | — | 1 layer point bond |
| Sample 15 | PE | PET | 30:70 | | 1 layer flat bond |

TABLE 2

| Sample | Basis Weight (osy) | Thickness (mils) | Hydrohead (cm) | Air Permeability (cfm/ft²/min) | Opacity |
|---|---|---|---|---|---|
| Sample 1 | 2.38 | 5.61 | 47 | 0.96 | — |
| Sample 2 | 2.4 | 8.7 | 35 | 2.0 | 47.9 |
| Sample 3 | 2.50 | 8.98 | 24 | 25.27 | — |
| Sample 4 | 2.43 | 5.75 | 80 | 0.26 | 48.6 |
| Sample 5 | 2.19 | 5.18 | 62 | 0.23 | 50.9 |
| Sample 6 | 2.39 | 5.93 | 61 | 0.89 | 58.0 |
| Sample 7 | 2.23 | 6.69 | 36 | 4.38 | 50.5 |
| Sample 8 | 2.24 | 6.70 | 38 | 3.55 | 55.4 |
| Sample 9 | 1.96 | 5.44 | 37 | 3.28 | 51.4 |
| Sample 10 | 2.44 | 7.78 | 26 | 3.06 | 60.3 |
| Sample 11 | 2.70 | 7.67 | — | 0.34 | — |
| Sample 12 | 2.90 | 8.2 | 45 | 0.11 | 52.3 |
| Sample 13 | 2.41 | 4.61 | 38 | 0.89 | 47.6 |
| Sample 14 | 3.08 | 5.80 | 69 | 0.41 | 54.8 |
| Sample 15 | 3.20 | 5.50 | 77 | 0 | |

TABLE 3

| Sample | MD Grab (pounds) | MD Elongation (%) | XD Grab (pounds) | XD Elongation (%) | Mullen (pounds) | MVTR (g/100 inch²) |
|---|---|---|---|---|---|---|
| Sample 1 | 50.35 | 37.90 | 35.80 | 93.60 | — | 31.9 |
| Sample 2 | 59.1 | 43.20 | 39.9 | 82.90 | — | 27.4 |

TABLE 3-continued

| Sample | MD Grab (pounds) | MD Elongation (%) | XD Grab (pounds) | XD Elongation (%) | Mullen (pounds) | MVTR (g/100 inch²) |
|---|---|---|---|---|---|---|
| Sample 3 | 41.00 | 87.90 | 9.10 | 182.40 | 29.00 | 97.9 |
| Sample 4 | 64.13 | 43.77 | 27.22 | 147.00 | 33.33 | 48.8 |
| Sample 5 | 52.11 | 39.24 | 21.27 | 190.51 | 27.00 | 45.8 |
| Sample 6 | 68.45 | 94.51 | 25.04 | 174.32 | 28.67 | 85 |
| Sample 7 | 32.20 | 82.50 | 9.80 | 186.47 | 18.00 | 71.5 |
| Sample 8 | 31.80 | 73.16 | 11.64 | 219.80 | 15.75 | 71.5 |
| Sample 9 | 33.30 | 101.97 | 10.25 | 183.06 | 13.00 | 70.8 |
| Sample 10 | 36.40 | 83.70 | 10.23 | 165.05 | 18.00 | 64.5 |
| Sample 11 | 57.70 | 50.01 | 28.70 | 34.30 | 33.50 | 34.8 |
| Sample 12 | 56.70 | 56.20 | 29.10 | 79.30 | 33.00 | 70.9 |
| Sample 13 | 98.89 | 76.15 | 55.70 | 89.25 | 47.75 | 72.5 |
| Sample 14 | 126.52 | 84.28 | 76.68 | 94.90 | 81.75 | 25.3 |
| Sample 15 | 131.00 | 107 | 95.3 | 132.68 | — | — |

In Samples 11 and 12, two layers of a spunbond nonwoven fabric formed from polyethylene monocomponent filaments were sandwiched between outer layers of PE/PET sheath/core bicomponent spunbond nonwoven fabric and subjected to calendering to produce a composite sheet material.

From the above data, it can be seen that nonwoven fabrics prepared in accordance with the invention may be produced to have excellent tensile, breathability and liquid barrier properties.

EXAMPLE 2

In the following example, a sheet material that may be particularly useful in envelope applications was prepared. The sheet material comprised two layers of bicomponent filaments having sheath/core configuration wherein the weight ratio of the sheath component to the core component was about 70:30. The sheath component comprised polyethylene and the core comprised polypropylene, both of which are discussed above in Example 1. The bicomponent filaments were thermally bonded together with a calender nip under a pressure of 2500 pounds per inch and a temperature of 265° F. The first layer had a relatively white appearance and comprised the exterior surface of the envelope. The second layer included a carbon pigment that was incorporated into the sheath and had a relatively darker color than the first layer. The properties of the resulting fabric are summarized in Table 4 below.

TABLE 4

| Sample | Basis Weight (osy) | MD Grab (%) | MD Elongation (%) | XD Grab (lbs) | XD Elongation (%) | Hydrohead (cm) | MVTR (g/100 inch²) | Opacity % |
|---|---|---|---|---|---|---|---|---|
| 16 | 2.4 | 99 | 76 | 56 | 89 | 38 | 73 | 98 |

From the data in Table 4, it can be seen that incorporating a pigment into the second layer substantially increased the opacity of the resulting sheet material. In contrast, Sample 9, which is discussed above and did not include a colored pigment, had an opacity of about 51%.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A nonwoven sheet material having liquid barrier properties, said sheet material having opposite sides and consisting of a spunbond nonwoven fabric including bicomponent filaments having first and second polymer components that are arranged in substantially distinct zones within the filaments, with the first polymer component formed of a relatively lower melting polyethylene polymer and the second component formed of a relatively higher melting polymer, the filaments of the nonwoven fabric being densely arranged and compacted against one another to form a substantially smooth outer surface on at least one said side of the nonwoven sheet material, and the nonwoven fabric being high pressure calendered at a nip pressure of about 1500 to 3000 pounds per lineal inch and at an elevated temperature such that the lower melting first polymer component of the filaments is fused to the contacting surface portions of adjacent filaments to impart strength and coherency to the nonwoven fabric, and the lower melting polymer component has softened and flowed to form a microporous film that permits moisture vapor to be transmitted through the sheet material while serving as a barrier to the penetration of liquids, and said sheet material having an air permeability, measured in accordance with ASTM test method D-1117, of from 0 to 5 cfm/ft²/min.

2. The nonwoven sheet material of claim 1, wherein the microporous film is present on one of the sides of the nonwoven sheet material and wherein the opposite side of the nonwoven sheet material has a filamentary texture exhibiting the appearance of flattened filaments.

3. The nonwoven sheet material of claim 1, wherein the polymer of the lower melting component comprises polyethylene and the polymer of the higher melting component is selected from the group consisting of polypropylene, polyester and nylon.

4. The nonwoven sheet material of claim 1, which has a hydrostatic head of at least 15 cm.

5. The nonwoven sheet material of claim 1, which has a moisture vapor transmission rate of at least 4 g/100 in$^2$/24 hrs. at 50% relative humidity (RH) and 23° C. (73° F.).

6. The nonwoven sheet material of claim 1, having a basis weight within the range of 10 to 150 gsm.

7. The nonwoven sheet material of claim 1, wherein the bicomponent filaments are of a sheath-core cross-sectional configuration, the filaments having a core component formed of a said higher melting polymer and a sheath component formed of said lower melting polymer.

8. The nonwoven sheet material of claim 7, wherein the polyethylene sheath component includes an anti-microbial agent incorporated therein.

9. The nonwoven sheet material of claim 8, wherein the antimicrobial agent comprises a thermally sensitive organic compound having a degradation temperature that is less than the melting temperature of the core and greater than the melting temperature of the sheath.

10. The nonwoven sheet material of claim 8, wherein the antimicrobial agent is selected from the group consisting of 2,4,4'-trichloro-2-hydroxy diphenol ether and 5-chloro-2-phenol (2,4 dichlorophenoxy) compounds.

11. The nonwoven sheet material of claim 1, further comprising a layer of meltblown polyethylene fibers overlying one side of the nonwoven spunbond nonwoven fabric and adhered thereto.

12. The nonwoven sheet material of claim 1, wherein the sheet material comprises a first layer of the bicomponent filaments and a second layer of the bicomponent filaments wherein the bicomponent filaments of the second layer include one or more pigments incorporated into the sheath polymer.

13. The nonwoven sheet material of claim 12, wherein the sheet material has an opacity of at least 90 percent.

14. The nonwoven sheet material of claim 1, further comprising a layer of nanofibers overlying one side of the spunbond nonwoven fabric and adhered thereto.

15. A housewrap formed of the sheet material of claim 1, wherein the sheet material has a hydrohead of at least 15 cm and a moisture vapor transmission rate of at least 20 g/100in$^2$/24 hrs. at 50% relative humidity (RH) and 23° C. (73° F.).

16. A protective garment formed of the sheet material of claim 1.

17. A multi-layer composite nonwoven sheet material comprising the nonwoven sheet material of claim 1 laminated to at least one additional nonwoven fabric layer.

18. The multi-layer composite nonwoven sheet material of claim 17, wherein the at least one additional nonwoven fabric layer is selected from the group consisting of a spunbond nonwoven fabric and a meltblown nonwoven fabric.

19. A breathable nonwoven sheet material having liquid barrier properties comprising substantially continuous sheath-core filaments that are densely arranged and compacted against one another and thermally calendered at elevated termperature at a nip pressure of about 1500 to 3000 pounds per lineal inch to form a smooth outer surface on at least one side of the sheet material, wherein the sheath component comprises polyethylene or a copolymer thereof and the core component comprises polyester, polypropylene, or copolymers thereof having a higher melting temperature than the sheath-component, and wherein the sheath polymer is fused to the contacting surface portions of adjacent filaments to impart strength and coherency to the nonwoven sheet materials and the sheath polymer has softened and flowed to form a microporous film-like surface that permits moisture vapor to be transmitted through the sheet material while serving as a barrier to the penetration of liquids, and said sheet material having an air permeability, measured in accordance with ASTM test method D-1117, of from 0 to 5 cfm/ft$^2$/min.

20. The nonwoven sheet material of claim 19, wherein the sheet material has a hydrohead of at least 15 cm and a moisture vapor transmission rate of at least 20 g/100in$^2$/24 hrs. at 50% relative humidity (RH) and 23°C. (73° F.).

21. The nonwoven sheet material of claim 19, wherein the sheath comprises from about 20 to 50 weight percent polyethylene and from about 50 to 80 weight percent polyethylene terephthalate.

22. The nonwoven sheet material of claim 19, wherein the sheath comprises from about 20 to 50 weight percent polyethylene and from about 50 to 80 weight percent polypropylene.

23. The nonwoven sheet material of claim 1, wherein the bicomponent filaments have a structured cross-sectional configuration selected from the group consisting of side-by-side, segmented pie, islands-in-the-sea or tipped multi-lobal structures.

24. The nonwoven sheet material of claim 1, wherein the nonwoven fabric is high pressure calendered at a temperature between about 240 to 265° F.

* * * * *

UNITED STATES PATENT AND TRADEMARK OFFICE
CERTIFICATE OF CORRECTION

PATENT NO. : 7,790,641 B2
APPLICATION NO. : 11/460453
DATED : September 7, 2010
INVENTOR(S) : Baker, Jr. et al.

It is certified that error appears in the above-identified patent and that said Letters Patent is hereby corrected as shown below:

Column 11,
Line 19, "MTCC-127" should read --AATCC-127--.

Column 16,
Lines 20 and 21, "materials" should read --material,--.

Signed and Sealed this
Thirteenth Day of December, 2011

David J. Kappos
*Director of the United States Patent and Trademark Office*